United States Patent
Sedlacek et al.

(10) Patent No.: US 9,654,954 B2
(45) Date of Patent: May 16, 2017

(54) PROVIDING AN IMS VOICE SESSION VIA A PACKET SWITCH NETWORK AND AN EMERGENCY VOICE SESSION VIA A CIRCUIT SWITCH NETWORK

(75) Inventors: Ivo Sedlacek, Landskrona (SE); Ralf Keller, Würselen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/374,156

(22) PCT Filed: Jan. 26, 2012

(86) PCT No.: PCT/EP2012/000349
§ 371 (c)(1),
(2), (4) Date: Oct. 24, 2014

(87) PCT Pub. No.: WO2013/110293
PCT Pub. Date: Aug. 1, 2013

(65) Prior Publication Data
US 2015/0055554 A1 Feb. 26, 2015

(51) Int. Cl.
*H04W 4/22* (2009.01)
*H04W 76/00* (2009.01)
(Continued)

(52) U.S. Cl.
CPC .......... *H04W 4/22* (2013.01); *H04L 65/1006* (2013.01); *H04L 65/1016* (2013.01);
(Continued)

(58) Field of Classification Search
CPC ............. H04L 65/1006; H04L 65/1016; H04L 65/1053; H04L 65/1069; H04M 7/0024;
(Continued)

(56) References Cited

U.S. PATENT DOCUMENTS

2002/0002041 A1* 1/2002 Lindgren ............ H04M 7/1205
455/404.1
2004/0063430 A1* 4/2004 Cave .................... H04W 36/30
455/436
(Continued)

OTHER PUBLICATIONS

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 10)", 3GPP TS 23.401 V10.5.0, Sep. 2011, 1-282.

(Continued)

*Primary Examiner* — Stephen J Clawson
(74) *Attorney, Agent, or Firm* — Murphy, Bilak & Homiller, PLLC (57) ABSTRACT

A communication network comprises a packet switched domain associated with a packet switched capable radio access network and supports an Internet Protocol Multimedia Subsystem voice session via the packet switched capable radio access network. The terminal supports an Internet Protocol Multimedia Subsystem voice session via the packet switched capable radio access network and an Internet Protocol Multimedia Subsystem emergency voice session via the packet switched capable radio access network. A method is executed by a control node of the packet switched domain and comprises sending instruction information to the terminal. The instruction information instructs the terminal to execute an Internet Protocol Multimedia Subsystem voice session via the packet switched capable radio access network without regard to whether the communication network has indicated support of an emergency session related data transmission via the packet switched capable radio access network and the packet switched domain.

13 Claims, 4 Drawing Sheets

(51) Int. Cl.
*H04L 29/06* (2006.01)
*H04M 7/00* (2006.01)
*H04W 8/02* (2009.01)
*H04W 8/06* (2009.01)
*H04W 48/18* (2009.01)
*H04W 80/00* (2009.01)
*H04W 88/06* (2009.01)
*H04W 48/14* (2009.01)

(52) U.S. Cl.
CPC ...... *H04L 65/1053* (2013.01); *H04L 65/1069* (2013.01); *H04M 7/0024* (2013.01); *H04W 8/02* (2013.01); *H04W 76/007* (2013.01); *H04W 8/06* (2013.01); *H04W 48/14* (2013.01); *H04W 48/18* (2013.01); *H04W 80/00* (2013.01); *H04W 88/06* (2013.01)

(58) Field of Classification Search
CPC ... H04W 60/00; H04W 76/007; H04W 88/06; H04W 8/02; H04W 8/06
USPC ........................................................ 370/328
See application file for complete search history.

(56) References Cited

U.S. PATENT DOCUMENTS

| | | | | |
|---|---|---|---|---|
| 2004/0192252 | A1* | 9/2004 | Aerrabotu | H04M 3/42195 455/404.1 |
| 2005/0101288 | A1* | 5/2005 | Hulkkonen | H04W 76/007 455/404.1 |
| 2008/0026752 | A1* | 1/2008 | Flore | H04W 36/0022 455/435.2 |
| 2009/0098851 | A1* | 4/2009 | Liebhart | H04L 29/06 455/404.1 |
| 2009/0122793 | A1* | 5/2009 | Yang | H04L 65/40 370/352 |
| 2011/0086607 | A1* | 4/2011 | Wang | H04M 3/5116 455/404.1 |
| 2012/0057568 | A1* | 3/2012 | Lim | H04W 4/22 370/331 |

OTHER PUBLICATIONS

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 11)", 3GPP TS 23.401 V11.0.0, Dec. 2011, 1-287.

3GPP, "3rd Generation Partnership Project; Technical Specification Group Services and System Aspects; IP Multimedia Subsystem (IMS) emergency sessions (Release 11)", 3GPP TS 23.167 V11.3.0, Dec. 2011, 1-41.

3GPP, "3rd Generation Partnership Project; Technical Specification Group Services and System Aspects; IP Multimedia Subsystem (IMS) emergency sessions (Release 11)", 3GPP TS 23.167 V11.1.0, Mar. 2011, 1-41.

3GPP, "3rd Generation Partnership Project; Technical Specification Group Services and System Aspects; IP Multimedia Subsystem (IMS); Stage 2 (Release 11)", 3GPP TS 23.228 V11.1.0, Jun. 2011, 1-274.

Unknown, Author, "Correction of names for voice domain preference", C1-101450, 3GPP TSG-CT WG1 Meeting #64, Kyoto Japan, May 10-14, 2010, 1-4.

Unknown, Author, "Setting of IMS voice over PS Session Supported Indication based on IMS roaming agreements", S2-104132, 3GPP TSG SA WG2 Meeting #80, Brunstad, Norway, Aug. 30-Sep. 3, 2010, 1-3.

* cited by examiner

PROVIDING AN IMS VOICE SESSION VIA A PACKET SWITCH NETWORK AND AN EMERGENCY VOICE SESSION VIA A CIRCUIT SWITCH NETWORK

TECHNICAL FIELD

The invention relates to telecommunications, and in particular to methods of and a control node for providing an availability of an execution of an Internet Protocol Multimedia Subsystem voice session via a packet switched capable radio access network of an Internet Protocol Multimedia Subsystem based communication network with a terminal, a terminal to be provided with an availability of an execution of an Internet Protocol Multimedia Subsystem voice session via a packet switched capable radio access network of an Internet Protocol Multimedia Subsystem based communication network, and a computer program.

BACKGROUND

An Internet Protocol (IP) Multimedia Subsystem (IMS) communication network may offer the possibility of using IP based functionalities for transferring voice data. In particular, an IMS communication network offers the functionalities of an execution of an IMS voice session and/or an execution of an IMS emergency voice session, which functionalities can be used by a terminal.

However, depending on the underlying network architecture of the IMS based communication network, it may happen that the IMS based communication network may only support an IMS voice session via a packet switched capable radio access network, but does not support an emergency session related data transmission via the packet switched capable radio access network. On the other hand, a terminal attached to the IMS based communication network may support both an IMS voice session and an IMS emergency session via the packet switched capable radio access network. Owing to regulatory requirements defined for an operator of the IMS communication network, the terminal is only allowed to use an IMS voice session for communication, if the IMS based communication network also supports the emergency session related data transmission via the packet switched capable radio access network. This scenario may apply, for example, for a terminal in accordance with Release 9 and an Evolved Packet Core (EPC) in accordance with Release 9 in combination with an IMS based communication network in accordance with Release 9.

Therefore an optimum usage of capabilities of the terminal is potentially not possible.

SUMMARY

It is an object of the invention to provide an improved usage of capabilities of a terminal.

The object defined above is solved by methods and a control node for providing an availability of an execution of an Internet Protocol Multimedia Subsystem voice session via a packet switched capable radio access network of an Internet Protocol Multimedia Subsystem based communication network with a terminal, a terminal for being provided with an availability of an execution of an Internet Protocol Multimedia Subsystem voice session via a packet switched capable radio access network of an Internet Protocol Multimedia Subsystem based communication network, and a computer program according to the independent claims.

According to an exemplary aspect of the invention, a method of providing an availability of an execution of an Internet Protocol Multimedia Subsystem voice session via a packet switched capable radio access network of an Internet Protocol Multimedia Subsystem based communication network with a terminal is provided. The communication network comprises a packet switched domain associated with the packet switched capable radio access network. The communication network supports an Internet Protocol Multimedia Subsystem voice session via the packet switched capable radio access network. The terminal supports an Internet Protocol Multimedia Subsystem voice session via the packet switched capable radio access network and an Internet Protocol Multimedia Subsystem emergency voice session via the packet switched capable radio access network. The method is executed by a control node of the packet switched domain. The method comprises sending instruction information to the terminal. The instruction information instructs the terminal to execute an Internet Protocol Multimedia Subsystem voice session via the packet switched capable radio access network without regard to whether the communication network having indicated support of an emergency session related data transmission via the packet switched capable radio access network and the packet switched domain.

According to another exemplary aspect of the invention, a method of providing an availability of an execution of an Internet Protocol Multimedia Subsystem voice session via a packet switched capable radio access network of an Internet Protocol Multimedia Subsystem based communication network with a terminal is provided. The communication network comprises a packet switched domain associated with the packet switched capable radio access network. The communication network supports an Internet Protocol Multimedia Subsystem voice session via the packet switched capable radio access network. The terminal supports an Internet Protocol Multimedia Subsystem voice session via the packet switched capable radio access network and an Internet Protocol Multimedia Subsystem emergency voice session via the packet switched capable radio access network. The method is executed by the terminal. The method comprises receiving instruction information from a control node of the packet switched domain. The instruction information instructs the terminal to execute an Internet Protocol Multimedia Subsystem voice session via the packet switched capable radio access network without regard to whether the communication network having indicated support of an emergency session related data transmission via the packet switched capable radio access network and the packet switched domain.

According to another exemplary aspect of the invention, a control node for providing an availability of an execution of an Internet Protocol Multimedia Subsystem voice session via a packet switched capable radio access network of an Internet Protocol Multimedia Subsystem based communication network with a terminal is provided. The communication network comprises a packet switched domain associated with the packet switched capable radio access network. The communication network supports an Internet Protocol Multimedia Subsystem voice session via the packet switched capable radio access network. The terminal supports an Internet Protocol Multimedia Subsystem voice session via the packet switched capable radio access network and an Internet Protocol Multimedia Subsystem emergency voice session via the packet switched capable radio access network. The control node is part of the packet switched domain. The control node comprises a sending unit configured to send instruction information to the terminal. The instruction information instructs the terminal to execute an Internet Protocol Multimedia Subsystem voice session via the packet switched capable radio access network without regard to whether the communication network having indicated support of an emergency session related data transmission via the packet switched capable radio access network and the packet switched domain.

According to another exemplary aspect of the invention, a terminal for being provided with an availability of an execution of an Internet Protocol Multimedia Subsystem voice session via a packet switched capable radio access network of an Internet Protocol Multimedia Subsystem based communication network is provided. The communication network comprises a packet switched domain associated with the packet switched capable radio access network. The communication network supports an Internet Protocol Multimedia Subsystem voice session via the packet switched capable radio access network. The terminal supports an Internet Protocol Multimedia Subsystem voice session via the packet switched capable radio access network and an Internet Protocol Multimedia Subsystem emergency voice session via the packet switched capable radio access network. The terminal comprises a reception unit configured to receive instruction information from a control node of the packet switched domain. The instruction information instructs the terminal to execute an Internet Protocol Multimedia Subsystem voice session via the packet switched capable radio access network without regard to whether the communication network having indicated support of an emergency session related data transmission via the packet switched capable radio access network and the packet switched domain.

According to another exemplary aspect of the invention, a computer program is provided. The computer program, when being executed by a processor, is configured to carry out or control a method of providing an availability of an execution of an Internet Protocol Multimedia Subsystem voice session via a packet switched capable radio access network of an Internet Protocol Multimedia Subsystem based communication network with a terminal as described above.

Further exemplary embodiments of the invention are described in the dependent claims.

BRIEF DESCRIPTION OF THE DRAWINGS

Embodiments of the invention will be described in more detail hereinafter with reference to examples, but to which the scope of the invention is not limited.

DETAILED DESCRIPTION

The illustration in the drawing is schematic. In different drawings, similar or identical elements or steps are provided with the same reference signs or with reference signs which are different from one another within the first digit.

In the following, the methods, the control node, the terminal, and the computer program according to the exemplary aspects of the invention will be explained in more detail.

Within the context of the present invention, the term "radio access network" may particularly denote a network or network portion of a communication network which may offer connectivity for a terminal to another network portion of the communication network.

The term "packet switched capable radio access network" may particularly denote a radio access network defined above which may operate using on the mentioned communication or connectivity type. The term may refer to a physical radio access network operating exclusively based on the mentioned communication type, or may refer to a radio access network operating based on the mentioned communication type in addition to one or more other communication types. In the latter case, the radio access network may comprise at least two radio access technologies, namely the packet switched communication type and another communication type distinct from the packet switched communication type.

The term "domain" of a communication network may particularly denote a network portion of a core network of the communication network.

The term "packet switched domain" may particularly denote a network portion which may operate based on exclusively the mentioned communication or connectivity type.

The term "the terminal supports a session of a particular type" may particularly denote that the terminal may be able to handle establishment and routing data of the session of the particular type.

The term "the communication network supports a session of a particular type" may particularly denote that the communication network, for example one or more nodes of the communication network, may be able to handle the establishment and routing data of the session of the particular type.

The terms "Internet Protocol Multimedia Subsystem voice session" and "Internet Protocol Multimedia Subsystem emergency voice session" may particularly denote a voice session or a call which may be routed via an Internet Protocol Multimedia Subsystem domain of the communication network, respectively. In particular, nodes of the Internet Protocol Multimedia Subsystem domain may be involved in the session routing.

The term "instruction information" may particularly denote information which may comprise a higher priority level compared to other indication information related to network capabilities. In particular, the instruction information may overrule one or more mechanisms defined in the terminal, which mechanisms may relate to the availability of a functionality in the terminal. In particular, such an aforementioned mechanism may be based on, for example may take into account, other support indications of the communication network to be present in the terminal and/or may be based on, for example may take into account, an absence of such support indications in the terminal.

The term "support of an emergency session related data transmission via the packet switched capable radio access network" may particularly denote a support for establishment and routing data of an emergency session via the packet switched capable radio access network. In particular, the emergency session may be an emergency voice session also commonly referred to as an emergency call or a media based emergency session, for example a text message using Global Text Telephony (GTT).

The term "the instruction information instructs the terminal to execute an Internet Protocol Multimedia Subsystem voice session without regard to whether the communication network having indicated support of emergency session related data transmission" may particularly denote that the instruction information may instruct the terminal to execute the Internet Protocol Multimedia Subsystem voice session irrespectively of or independently of the communication network having indicated support of the emergency session related data transmission via the packet switched capable radio access network.

The terms "capability" and "functionality" may be used in the present application in an exchangeable way.

The Internet Protocol Multimedia Subsystem may be particularly defined in accordance with Third Generation Partnership Project (3GPP) Technical Specification (TS) 23.228 v11.1.0.

According to the exemplary aspects of the invention, a terminal may be enabled to always use Internet Protocol Multimedia Subsystem voice via the packet switched capable radio access network of the Internet Protocol Multimedia Subsystem based communication network in which the terminal may reside. In particular, a network according to Release 8 and a terminal and an EPC according to Release 9 may be enabled to communicate with one another using Internet Protocol Multimedia Subsystem voice. Therefore, an improved usage of available capabilities of the terminal may be enabled, and network capabilities as to the emergency session related data transmission via the packet switched capable radio access network and the packet switched domain are not taken into account. Further, a user experience of a user associated with the terminal may be enhanced.

Next, further exemplary embodiments of the method executed by the control node will be explained. However, these embodiments also apply to the method executed by the terminal, the control node, the terminal, and the computer program.

The communication network may further comprise a circuit switched domain associated with a circuit switched capable radio access network, and/or an Internet Protocol Multimedia Subsystem domain communicatively coupled with the circuit switched domain and/or the packet switched domain. The term "circuit switched domain" may particularly denote a network portion which may operate based on exclusively the mentioned communication type.

The term "circuit switched capable radio access network" may particularly denote a network portion which may operate based on circuit switched communication optionally in combination with packet switched communication and/or another, different type of communication. The Internet Protocol Multimedia Subsystem domain may operate based on Internet Protocol (IP) communication.

In particular, the packet switched capable radio access network and the circuit switched capable radio access network may be embodied in two physically separate radio access networks, for example each of which comprising dedicated nodes configured to provide communication within the respective radio access network. Alternatively, both radio access networks may be embodied in one physical radio access network which may comprise a radio access technology associated with the packet switched capable radio access network and another radio access technology associated with the circuit switched capable radio access network. In particular, communication within the one physical radio access network may be provided by separate and/or shared nodes.

For example, the packet switched capable radio access network may be based on Long Term Evolution (LTE), Evolved-Universal Mobile Telecommunications System (UMTS) Terrestrial Radio Access Network (UTRAN) (E-UTRAN), UTRAN, High Speed Packet Access (HSPA) or Global System for Mobile Communications (GSM) Enhanced Data Rates for GSM Evolution (EDGE) Radio Access Network (GERAN). In particular, the circuit switched capable radio access network may be based on GERAN, UTRAN or Wideband Code Division Multiple Access (WCDMA).

For example, in a case of the LTE based radio access network, the support of the emergency session related data transmission via the packet switched capable radio access network together with the packet switched domain may relate to the support of EPS bearers, i. e. Packet Data Network (PDN) connectivity, between a packet switched domain of a core network of the respective communication network and the terminal via the packet switched capable radio access network, whereas, in a case of an UTRAN based radio access network the support of the emergency session related data transmission via the packet switched capable radio access network may relate to a support of a Packet Data Protocol (PDP) context between the terminal and a Serving General Package Radio Service Support Node (SGSN) and a Gateway GPRS Support Node (GGSN) and a PDN context between the SGSN and a Gateway GPRS Support Node (P-GW).

In particular, the communication network may indicate its support of the emergency session related data transmission by sending a respective explicit support indication or related information from which terminal may be enabled to deduce the network capability. For example, the related information may comprise or may be configured as a support indication for indicating support of emergency bearers, for example an Emergency Service Support indicator particularly defined in accordance with TS 23.401 v10.5.0. Alternatively, the related information may comprise or may be configured as a support indication for indicating support of a PDP and/or PDN context related to the emergency session.

In particular, the communication network may indicate its support of an Internet Protocol Multimedia Subsystem voice session by sending an Internet Protocol Multimedia Subsystem voice over packet switched support indication, which indication may be particularly defined in accordance with TS 23.401 v10.5.0.

The communication network may comprise a circuit switched domain, particularly the circuit switched domain mentioned above, associated with a circuit switched capable radio access network, particularly the circuit switched capable radio access network mentioned above, and the instruction information may further instruct the terminal to exclusively initiate a circuit switched emergency voice session via the circuit switched capable radio access network. The term "circuit switched emergency voice session" may particularly denote a voice session which may routed via the circuit switched domain and an Internet Protocol Multimedia Subsystem domain of the communication network, but not via the packet switched domain. In particular, initiating the circuit switched emergency voice session may comprise falling back from the packet switched capable radio access network to the circuit switched capable radio access network for attempting to establish an emergency voice session to a terminating side via the circuit switched capable radio access network. Therefore lengthy attempts of the terminal to initiate an Internet Protocol Multimedia Subsystem emergency voice session via the packet switched capable radio access network which cannot be recognized and/or accepted by the Internet Protocol Multimedia Subsystem based communication network may be avoided. In particular, emergency voice may be easily provided with the terminal in that circuit switched based routing of emergency voice sessions may be offered by a high number of communication networks, since these communication networks support an emergency session related data transmission, for example an emergency bearer service over circuit switched access.

Further, the method can be applied for various kinds of emergency voice sessions. For example, the method may apply to unregistered emergency voice sessions, i.e. emergency voice sessions initiated by a terminal without a Subscriber Identity Module (SIM) card, to undetected emergency voice sessions, i.e. emergency voice sessions based on an unrecognized dialed emergency number, or to regular emergency voice sessions.

In particular, the sent instruction information may comprise or may be configured as a managed object to be used to configure the terminal as to the execution of an Internet Protocol Multimedia Subsystem voice session via the packet switched capable radio access network. Here, the term "managed object" my particularly denote resource information related to a device configuration or provisioning using Open Mobile Alliance (OMA) Device Management (DM).

The method may further comprise determining whether the circuit switched capable radio access network spatially at least covers the packet switched capable radio access network, wherein the sending of the instruction information may comprise sending the instruction information based on a result of the determining. In particular, the circuit switched capable radio access network and the packet switched capable radio access network may comprise almost identical coverage areas or the circuit switched capable radio access network may comprise a coverage area which may be larger than a coverage area of the packet switched capable radio access network. In particular, the control node executing the latter determination step may be part of a home or serving communication network of the terminal.

The serving or visited communication network of the terminal may be distinct of the home communication network of the terminal. This measure may allow for increasing the number of successful fall backs of the terminal.

The method may further comprise determining whether the terminal may support communication with the circuit switched domain of the communication network, wherein the sending of the instruction information may comprise sending the instruction information based on a result of the determining. In particular, the control node executing the latter determination step may be part of the home or serving communication network of the terminal. Therefore the emergency voice session may be enabled to be routed through the circuit switched domain to a terminating side.

The communication network may be a serving or visited communication network of the terminal distinct of a home communication network of the terminal, wherein the method may further comprise determining whether the terminal communicating with the circuit switched domain may be in accordance with a roaming agreement between the serving communication network of the terminal and the home communication network of the terminal, wherein the sending of the instruction information may comprise sending the instruction information based on a result of the determining.

In particular, the communication network may be a serving communication network of the terminal distinct of a home communication network of the terminal, wherein the method may further comprise determining whether the circuit switched capable radio access network may spatially at least cover the packet switched capable radio access network, wherein the sending of the instruction information may comprise sending the instruction information based on a result of the determining. In particular, this determination step may be omitted.

Thus, each of the aforementioned measures may contribute to the fact that the method may be also applicable to terminals roaming into its serving communication network. Hence, the method may account for various common use cases in communications.

In particular, in order to execute the step of the determining whether the terminal communicating with a circuit switched domain may be in accordance with the roaming agreement may be based on terminal identities predefined, for example by a stored list, in the control node of the serving communication network, which identities may indicate support of the terminal for the communication with or via the circuit switched domain or the type of the circuit switched domain. Alternatively or additionally, the roaming agreement may define one or more communication networks being compliant with the circuit switched domain of the communication network. In case a terminal may be identified to be registered in one of these communication networks, the control node may determine that the terminal may be capable of communicating with the circuit switched domain.

In particular, the control node may determine whether the terminal and the circuit switched domain may support communicating with or via the circuit switched capable radio access network in both cases of the communication network representing the serving communication network of the terminal and the home communication network of the terminal. Here, regarding the terminal capability, the control node may check a respective roaming agreement between the serving communication network and the home communication network.

In particular, the sending of the instruction information may comprise sending the instruction information, if one, particularly all, of the aforementioned determinations may be in the affirmative. In particular, the instruction information will not be sent by the control node, if at least one of the aforementioned determinations is not in the affirmative. In such a case, conventional procedures related to the usage of Internet Protocol Multimedia Subsystem voice and Internet Protocol Multimedia Subsystem emergency voice and defined in the serving communication network, particularly defined in accordance with 3GPP TS 23.167 v11.1.0, may be executed.

The method may further comprise receiving, from the terminal, a support indication indicating at least one of the terminal supporting an Internet Protocol Multimedia Subsystem voice session via the packet switched capable radio access network, the terminal supporting an Internet Protocol Multimedia Subsystem emergency voice session via the packet switched capable radio access network, and the terminal supporting communication with the circuit switched domain of the communication network, wherein the sending of the instruction information may comprise sending the instruction information based on the received support indication. In particular, when executing the above-mentioned determining step whether to send the instruction information to the terminal or not, the support indication sent by the terminal may be taken into account. Therefore, the execution of the determining steps may be particularly accurate. Further, it may be avoided that any terminal which does not comprise suitable capabilities may initiate an Internet Protocol Multimedia Subsystem voice session and/or an circuit switched emergency voice session via the circuit switched capable radio access network. Therefore safety of a user associated with the terminal may be enhanced in that the method may be only executed for suitable terminals with dedicated capabilities. In particular, sending one support indication to the control node for indicating support of an Internet Protocol Multimedia Subsystem voice session, an Internet Protocol Multimedia Subsystem emergency voice session, and for the communication via the circuit switched domain of the communication network may reduce signaling load in the communication network during the transfer of the associated information about the terminal capabilities.

The receiving of the support indication may comprise receiving the support indication in an attachment request of the terminal, in a location update request of the terminal or in an Internet Protocol Multimedia Subsystem registration request of the terminal for registering the terminal in an Internet Protocol Multimedia Subsystem domain of the communication network. Therefore, signaling executed in accordance with the method may be embedded in conventional communication procedures executed between the terminal and the communication network. Therefore, signaling load in the communication network may be significantly reduced.

The sending of the instruction information may comprise sending the instruction information in response to every reception of the support indication. In particular, when considering the above-mentioned message types comprising the support indication, the support indication may be sent at every instance when the terminal may roam into another communication network and/or may go from an idle state to a connected or an operational state. Therefore, the terminal may be always informed of a potential usage its own capabilities.

The support indication may comprise terminal manufacturing information of the terminal, particularly an International Mobile Equipment Identity (IMEI) of the terminal. Therefore, the control node may be enabled to deduce the capabilities of the terminal from conventionally sent terminal information. Here, the terminal does not have to be aware of its own capabilities such that sending the support indication to the control node may be executed in a passive way, and does not require a change in already available terminals.

In particular, the control node may derive the terminal capabilities from the support indication by looking up a table or, particularly in the case of the Internet Protocol Multimedia Subsystem voice session support and the support of the communication with the circuit switched domain, by requesting, from a subscriber server, for example a Home Subscriber Server, respective terminal capabilities based on the received support indication.

In the cases of the communication network representing the home communication network of the terminal or the serving communication network of the terminal, the terminal may have first registered in a voice session routing node of the Internet Protocol Multimedia Subsystem domain, for example a Serving-Call Session Control Function (S-CSCF), of the home communication network via one or more nodes of the packet switched domain of the serving and/or home communication networks. The subscriber server, for example the HSS, has been informed about the registration of the terminal. In particular, the subscriber server may be informed about the identity and/or address of the voice session routing node. Further, looking up a table may be executing in the case in which the communication network may be the serving communication network of the terminal. Requesting terminal capabilities from the subscriber server may be executed in the case in which the communication network may be the home communication network or the serving communication network.

In particular, to determine the support of the terminal for an Internet Protocol Multimedia Subsystem emergency voice session, the control node may directly derive the respective terminal capability from the received support indication or may look up a table stored in the control node based on the received support indication. In order to initiate an Internet Protocol Multimedia Subsystem emergency voice session towards a terminating side, the terminal may have to first register in a voice session routing node of the home communication network of the terminal, for example the S-CSCF.

Next, further exemplary embodiments of the method executed by the terminal will be explained. However, these embodiments also apply to the method executed by the control node, the control node, the terminal, and the computer program.

In particular, the terminal may store information related to the received instruction information. For example, the terminal may store the received instruction information or may store corresponding information.

The method may further comprise setting, based on the received instruction information, a terminal parameter of the terminal to indicate the availability of the execution of an Internet Protocol Multimedia Subsystem voice session via the packet switched capable radio access network. For example, the received instruction information in the form of the managed object may configure the terminal to comprise the terminal parameter and/or to accordingly set the terminal parameter. Therefore, the terminal may be configured to automatically use Internet Protocol Multimedia Subsystem voice and optionally the circuit switched emergency voice.

The method may further comprise initiating an Internet Protocol Multimedia Subsystem voice session via the packet switched capable radio access network exclusively if the terminal parameter may be set to indicate the availability of an execution of an Internet Protocol Multimedia Subsystem voice session via the packet switched capable radio access network. The term "initiating a voice session" may particularly denote originating or accepting the voice session, and establishing a respective communication. In particular, if no terminal parameter is set, for example if the terminal has not received the instruction information and/or has not stored the information related to the instruction information and/or no configuration of the terminal has been executed based on the received instruction information, or if the communication network has not sent the instruction information, the terminal does not use the Internet Protocol Multimedia Subsystem voice session service except the communication network may have indicated support of an emergency session related data transmission via the packet switched capable radio access network and the packet switched domain.

Next, further exemplary embodiments of the control node will be explained. However, these embodiments also apply to the methods, the terminal, and the computer program.

The control node may be configured as a Mobility Management Entity (MME) particularly associated with the LTE or E-UTRAN based packet switched capable radio access network or a Serving General Package Radio Service Support Node (SGSN) particularly associated with the UTRAN, GERAN or HSPA based packet switched capable radio access network.

The control node may be configured to, particularly automatically, execute one or more steps of the above-described methods.

Next, further exemplary embodiments of the terminal will be explained. However, these embodiments also apply to the methods, the control node, and the computer program.

In particular, the terminal may be configured to, particularly automatically, execute one or more steps of the above described methods.

Figure 1:
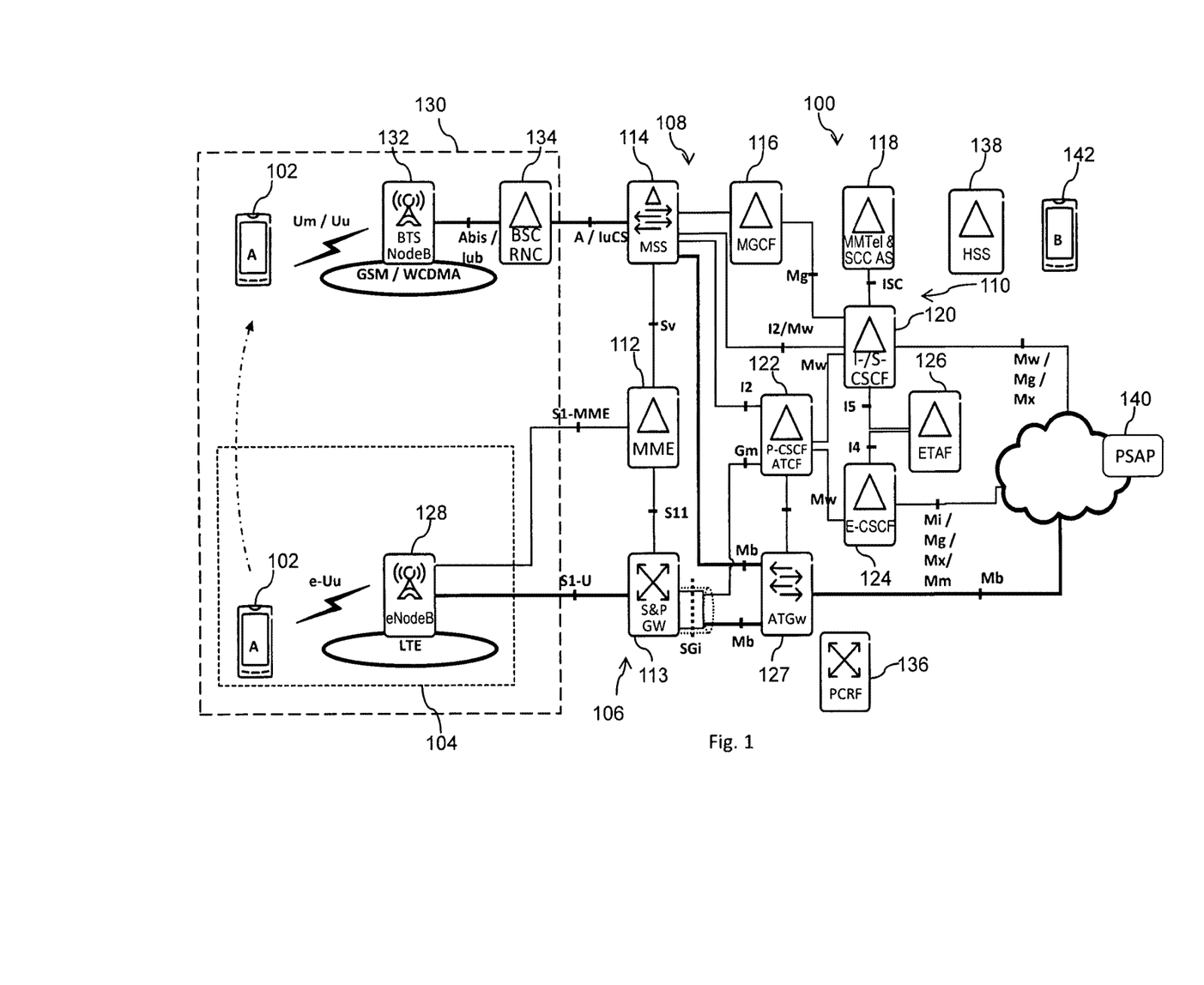
FIG. 1 is a block diagram illustrating a communication network associated with a method of providing an availability of an execution of an Internet Protocol Multimedia Subsystem voice session via a packet switched capable radio access network of an Internet Protocol Multimedia Subsystem based communication network with a terminal according to an exemplary embodiment of the invention.

Referring to FIG. 1 a network configuration of a serving communication network 100 of a terminal 102, for example a Visited Public Land Mobile Network (VPLMN), associated with a method of providing an availability of an execution of an IMS voice session via a packet switched capable radio access network 104 of the IMS based communication network 100 with the terminal 102 according to an exemplary embodiment of the invention will be explained.

Session Control Function (E-CSCF), and an Emergency Transfer Access Function (ETAF) 126. The E-CSCF 124 and the ETAF 126 are dedicated to establishment and routing of an emergency voice session. An Access Transfer Gateway (ATGW) 127 of the IMS domain 110 interfaces the S&P-GW 113 of the packet switched domain 106 and the P-CSCF 122.

The packet switched radio access network 104 comprises a node 128, an eNodeB, interfacing the terminal 102 and the packet switched domain 106. Further, the control node 114 of the circuit switched domain 108 is associated with a circuit switched capable radio access network 130 which may be configured as a GSM or a WCDMA radio access network. A node 132 of the circuit switched capable radio access network 130 is configured as a Base Transceiver Station (BTS) in case of the GSM radio access network 130 or as a NodeB in case of the WCDMA based radio access network 130. Another node 134 of the radio access network 130 interfaces the node 132 and the MSS 114, and is configured as a Base Station Controller (BSC) in case of the GSM radio access network 130 or as a Radio Network Controller (RNC) in case of the WCDMA radio access network 130.

The circuit switched capable radio access network 130 spatially covers completely the LTE radio access network 104, i.e. a coverage area of the LTE radio access network 104 is smaller than a coverage area of the circuit switched capable radio access network 130, and completely lies within the coverage area of the circuit switched capable radio access network 130.

The serving communication network 100 further comprises a Policy and Charging Rule Function (PCRF) 136 and a subscriber server 138, namely a Home Subscriber Server (HSS). An emergency voice session terminating side 140, a Public Safety Answering Point (PSAP), and another terminal 142 are also located in the serving communication network 100. The terminal 102 is not registered in the S-CSCF 120 for IMS voice over the packet switched radio access network 104, but in a S-CSCF of its home communication network, for example a Home Public Land Mobile Network (HPLMN). The terminal 102 is also registered in the S-CSCF of its HPLMN for IMS emergency voice session via the packet switched radio access network 104. The terminal 142 is registered in the S-CSCF 120 for IMS voice and IMS emergency voice via the packet switched radio access network 104, and subscriber data of the terminal 142 related to its IMS registration in the S-CSCF 120 are stored in the HSS 138. Hence, the terminal 142 is located in its home communication network 100, and may also attach to the communication network 100 via the radio access networks 104, 130.

The terminal 102 supports an IMS voice session to be routed via the packet switched radio access network 104 of the serving communication network 100, for example to the terminal 142, and also supports an IMS emergency voice session, for example to the PSAP 140 or another PSAP located in the serving communication network 100, via the packet switched radio access network 104.

The serving communication network 100 supports an IMS voice session via the packet switched radio access network 104, but does not support emergency session related data transmission via the packet switched radio access network 104 and the packet switched domain 106, and thus does not support handling of IMS emergency voice sessions towards the PSAP 140 via the packet switched radio access network 104 and the packet switched domain 106.

Figure 2:
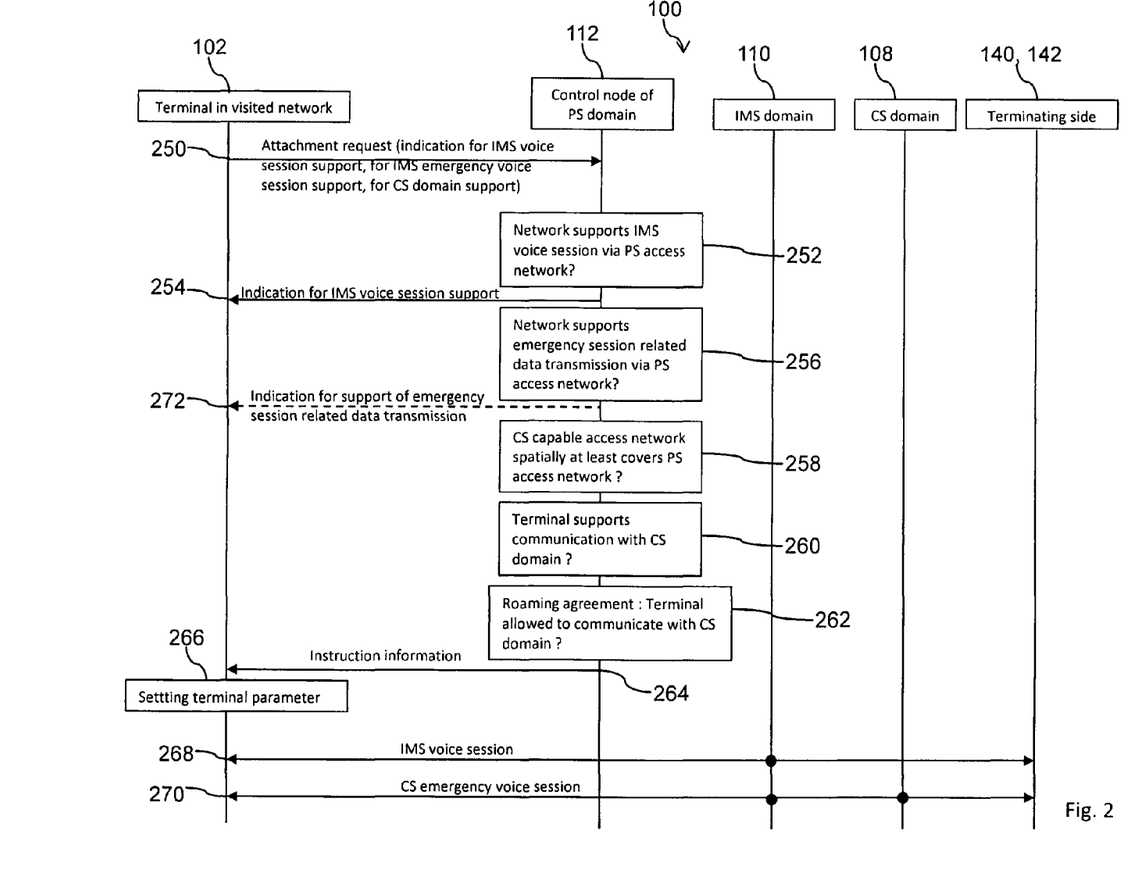
FIG. 2 is a flow diagram illustrating the method according to the exemplary embodiment of the invention associated with the communication network in FIG. 1.

Referring to FIG. 2, the method will be explained in more detail.

In a first step 250 of the method, the terminal 102 sends an attachment request to the MME 112. The attachment request comprises a support indication of the terminal 102 indicating support of the terminal 102 for an IMS voice session via the packet switched radio access network 104, for an IMS emergency voice session via the packet switched radio access network 104, and for communication via the circuit switched domain 108 of the serving communication network 100. The support indication is configured as an IMEI of the terminal 102. The MME 112 automatically deduces respective terminal capabilities as to support of an IMS voice session via the packet switched radio access network 104, support of an IMS emergency voice session via the packet switched radio access network 104, and support of communication via the circuit switched domain 108 from the IMEI.

Next, in a step 252, the MME 112 determines whether the serving communication network 100 supports an IMS voice session via the packet switched radio access network 104. Since the communication network 100 supports an IMS voice session via the packet switched radio access network 104, the determination of the step 252 is in the affirmative.

Therefore, in a next step 254, the MME 112 sends a support indication towards the terminal 102 indicating support of the communication network 100 for IMS voice sessions via the packet switched radio access network 104.

Next, in a step 256, the MME 112 determines whether the communication network 100 supports an emergency session related data transmission via the packet switched radio access network 104 and the packet switched domain 106. Since the latter is not the case, the determination of the MME 112 in the step 256 is not in the affirmative and thus no associated support indication, for example an Emergency Service Support indicator, is sent from the MME 112 to the terminal 102. Since the terminal 102 has not received, from the MME 112, any support indication indicating that the communication network 100 supports emergency session related data transmission via the packet switched radio access network 104 and the packet switched domain 106, the terminal 102 will not use IMS voice despite its own capabilities.

Thereupon, the methods proceeds to a step 258, in which the MME 112 determines whether the circuit switched capable access network 130 spatially at least covers the packet switched radio access network 104. Here, the determination is in the affirmative. Thereupon, the MME 112 determines in a step 260 whether the terminal 102 supports communication via the circuit switched domain 108 of the communication network 100. The determination of the step 260 is based on the IMEI received in the step 250, and is in the affirmative. Next, in a step 262, the MME 112 determines whether the terminal 102 is allowed to communicate via the circuit switched domain 110 in that the MME 112 checks a respective roaming agreement between the serving communication network 100 and the home communication network of the terminal 102. Assuming such a roaming agreement to be present and to be accordingly defined, the determination of the step 262 is in the affirmative.

Thereupon, in a next step 264, the MME 112 sends instruction information to the terminal 102, which, in a step 266, sets, based on the received instruction information, a terminal parameter to indicate, to the terminal 102, the availability of the execution of an IMS voice session via the packet switched radio access network 104 and the exclusive usage of circuit switched emergency voice sessions. Here, the instruction information instructs the terminal 102 to execute an IMS voice session via the packet switched radio access network 104 without regard to whether the communication network 100 having indicated support of the emergency session related data transmission via the packet switched radio access network 104 and the packet switched domain 106. Further, the instruction information instructs the terminal 102 to exclusively initiate circuit switched emergency voice sessions, for example, via the circuit switched capable radio access network 130, but not to initiate any IMS emergency voice session either via the packet switched radio access network 104 or via the circuit switched capable radio access network 130, if being based on HSPA, in combination with the packet switched domain 106.

The sent instruction information is configured as a managed object which causes a respective configuration of the terminal 102 to be configured in the terminal 102 in response to the reception of the instruction information.

Later, in a step 268, the terminal 102 initiates or accepts an IMS voice session via the packet switched radio access network 104 and the packet switched domain 106 to or from a terminating side, for example the terminal 142, respectively. Signaling and voice based payload data are routed through the IMS domain 110, as indicated by a circle in the step 268.

In case of an emergency event, the terminal 102 falls back from the packet switched radio access network 104 to the circuit switched capable radio access network 130, as indicated by the dashed arrow in FIG. 1. Thus, in a step 270, the terminal 102 initiates a circuit switched emergency voice session via the circuit switched capable radio access network 130 to a terminating side, for example the PSAP 140. Signaling and voice based payload data are routed through the circuit switched domain 108 and the IMS domain 110, as indicated by circles in the step 270, but not via the packet switched domain 106.

If one of the determinations in the steps 252, 258, 260 and 262 is not in the affirmative, the method may stop. Thus, the terminal 102 is not allowed to use the IMS voice service in terms of communicating using IMS voice sessions. Assuming the determination of the step 256 to be in the affirmative, the method may stop, and the MME 112 may send the associated support indication of the communication network 100 for the emergency session related data transmission, for example the Emergency Service Support indicator, to the terminal 102. This sending is indicated in FIG. 2 by a dashed arrow associated with a step 272.

A sequence of the steps 252-262, 272 may be different from the described embodiment.

Figure 3:
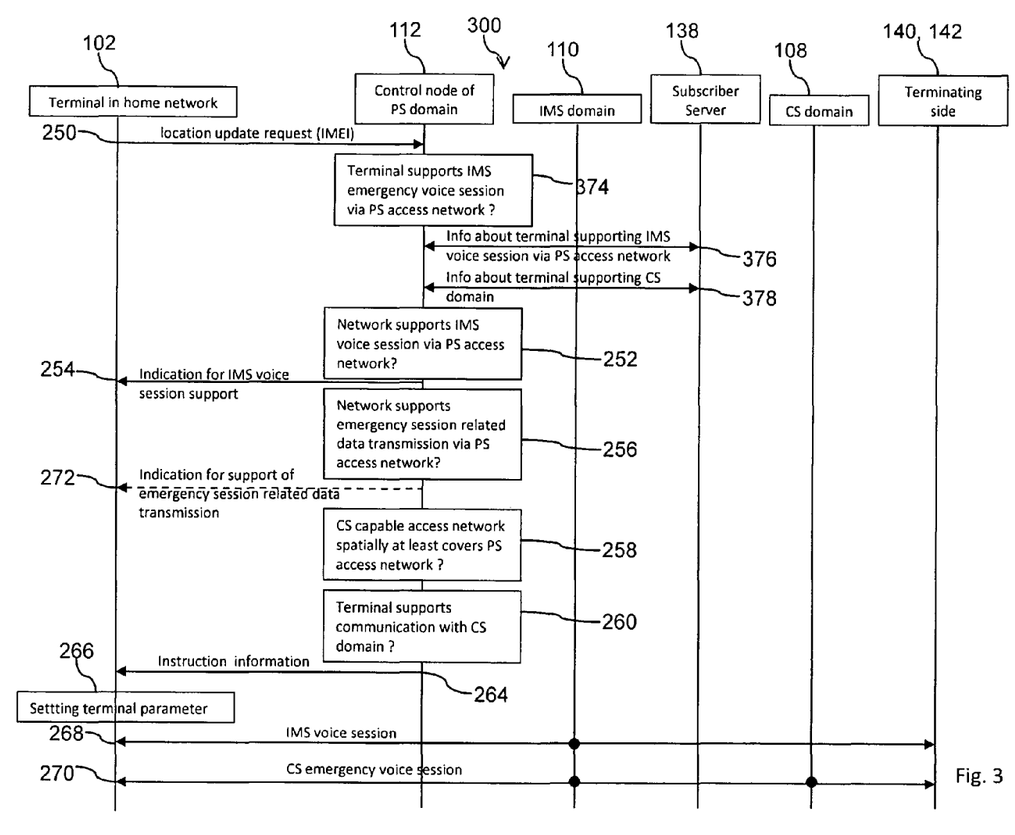
FIG. 3 is a flow diagram illustrating a method of providing an availability of an execution of an Internet Protocol Multimedia voice session via a packet switched capable radio access network of an Internet Protocol Multimedia Subsystem based communication network with a terminal according to another exemplary embodiment of the invention.

Referring to FIG. 3, a method of providing an availability of an execution of an IMS voice session of a terminal via a packet switched capable radio access network of an IMS based communication network with a terminal according to another exemplary embodiment of the invention will be explained. An underlying communication architecture of the communication network 300 associated with the method is identical to the communication network architecture illustrated in FIG. 1. However, the communication network 300 represents a home communication network 300 of the terminal 102, for example a HPLMN. Hence, the terminal 102 is registered for IMS voice and an IMS emergency voice service in an S-CSCF 120 of the home communication network 300. Subscriber data related to the IMS voice registration are stored in a HSS 138 of the HPLMN 300.

In the first step 350 of the method, the terminal 102 roams into the coverage area of the packet switched radio access network 104, and sends a location update request to the MME 112. The location update request includes an IMEI of the terminal 102, which represents a support indication of the terminal indicating support of the terminal 102 for an IMS voice session via the packet switched radio access network 104, for an IMS emergency voice session via the packet switched radio access network 104, and for communication of the terminal 102 via the circuit switched domain 106. Next, in a step 374, the MME 112 of the home communication network 300 determines, based on the received IMEI, whether the terminal 102 supports an IMS emergency voice session via the packet switched radio access network 104. The determination is executed by looking up a preconfigured table stored in the MME 112, and is in the affirmative. Next, in steps 376, 378, the MME 112 deduces from the received IMEI the terminal capabilities in that the MME 112 requests respective information from the HSS 138 based on the IMEI of the terminal 102. A sequence of the retrieval procedures executed in the steps 374 to 378 may vary in comparison to the described embodiment. Further, information received in the steps 376 to 378 from the HSS 138 will be received together in one message or may be received in two or more separate messages. Next, steps 252 to 260 explained with reference to FIG. 2 will be executed. As the communication network 300 represents the home communication network of the terminal 102, the step 262 of FIG. 2 is not executed. Next, steps 264 to 270 explained with reference to FIG. 2 will be executed.

Further, as explained with reference to FIG. 2, if the determination of the steps 252, 258, 260 are not in the affirmative, the method may stop. Assuming the determination of the step 256 to be in the affirmative, a respective support indication may be sent in a step 272 from the MME 112 to the terminal 102 indicating support of the communication network 300 for an emergency session related data transmission via the packet switched radio access network 104 and the packet switched domain 106, for example in the form of an emergency bearer service support indicator, namely the Emergency Service Support indicator. Hence, the terminal 102 may be allowed to use IMS voice.

Further, a sequence of the steps 252-260, 272 may be different from the described embodiment.

Figure 4:
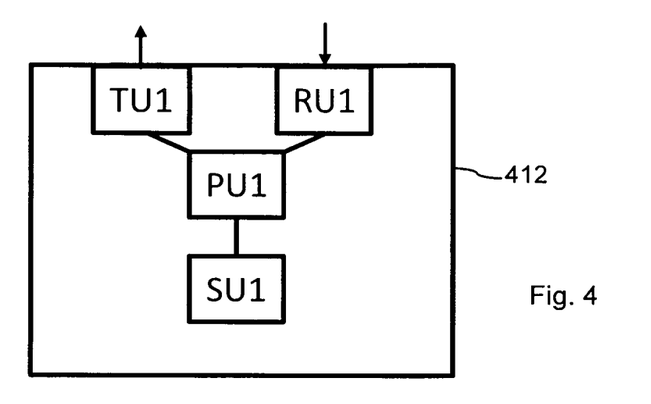
FIG. 4 is a block diagram illustrating a control node for providing an availability of an execution of an Internet Protocol Multimedia Subsystem voice session via a packet switched capable radio access network of an Internet Protocol Multimedia Subsystem based communication network with a terminal according to an exemplary embodiment of the invention.

Referring to FIG. 4, a control node for 412 for providing an availability of an execution of an IMS voice session via a packet switched capable radio access network of an IMS based communication network with a terminal is illustrated. The communication network comprises a packet switched domain associated with the packet switched capable radio access network. The communication network supports an IMS voice session via the packet switched capable radio access network. The terminal supports an IMS voice session via the packet switched capable radio access network and an IMS emergency voice session via the packet switched capable radio access network. The control node 412 is part of the packet switched domain. The control node 412 comprises a sending unit TU1 configured to send instruction information to the terminal. The instruction information instructs the terminal to execute an IMS voice session via the packet switched capable radio access network without regard to whether the communication network having indicated support of an emergency session related data transmission via the packet switched capable radio access network and the packet switched domain. The control node 412 further comprises a reception unit RU1 configured to receive information related to a method of providing an availability of an execution of an IMS voice session via a packet switched capable radio access network of an IMS based communication network with a terminal as described above, particularly with reference to FIGS. 1 to 3. Further, the control node 412 comprises a processing unit PU1 configured to process information related to the method, and a storing unit SU1 configured to store information related to the method.

The communication network further comprises a circuit switched domain associated with a circuit switched capable radio access network. The control node 412 further comprises a determining unit configured to determine whether the circuit switched capable radio access network spatially at least covers the packet switched capable radio access network. The determining unit is also configured to determine whether the terminal supports communication with the circuit switched domain of the communication network, and is configured to determine whether the terminal communicating with the circuit switched domain is in accordance with a roaming agreement between the serving communication network of the terminal and the home communication network of the terminal. The determining unit is part of the processing unit PU1. Alternatively, the control node 412 may comprise more determining units each of which being associated with one or more of the aforementioned determinations.

The control node 412 is embodied as a MME. Alternatively, the control node 412 may be embodied as a SGSN.

Figure 5:
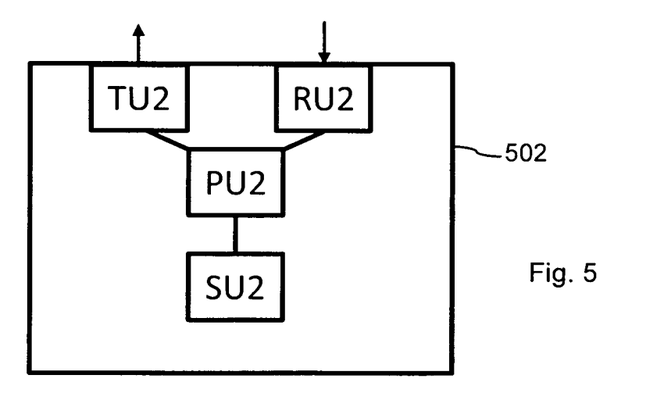
FIG. 5 is a block diagram illustrating a terminal for being provided with an availability of an execution of an Internet Protocol Multimedia Subsystem voice session via a packet switched capable radio access network of an Internet Protocol Multimedia Subsystem based communication network according to an exemplary embodiment of the invention.

Referring to FIG. 5, a terminal 502 for being provided with an availability of an execution of an IMS voice session via a packet switched capable radio access network of an IMS based communication network is illustrated. The communication network comprises a packet switched domain associated with the packet switched capable radio access network. The communication network supports an IMS voice session via the packet switched capable radio access network. The terminal 502 supports an IMS voice session via the packet switched capable radio access network and an IMS emergency voice session via the packet switched capable radio access network. The terminal 502 comprises a reception unit RU2 configured to receive instruction information from a control node of the packet switched domain. The instruction information instructs the terminal 502 to execute an IMS voice session via the packet switched capable radio access network without regard to whether the communication network having indicated support of an emergency session related data transmission via the packet switched capable radio access network and the packet switched domain. The terminal 502 further comprises a sending unit TU2 configured to send information related to a method of providing an availability of an execution of an IMS voice session via a packet switched capable radio access network of an IMS based communication network with a terminal as described above, particularly with reference to FIGS. 1 to 3. The terminal 502 also comprises a processing unit PU2 configured to process information related to the method, and a storing unit SU2 configured to store information related to the method.

Further, the terminal 502 comprises a setting unit configured to set, based on the received instruction information, a terminal parameter of the terminal 502 to indicate the availability of the execution of an IMS voice session via the packet switched capable radio access network. The setting unit is part of the processing unit PU2 and the storing unit SU2.

A relationship between the functionally based units and actual, physical units of the control node 412 and the terminal 502 may be different from the above described embodiments. For example, the determining unit of the control node 412 is part of the processing unit PU1 and the storing unit SU1.

While the invention has been illustrated and described in detail in the drawings and foregoing description, such illustration and description are to be considered illustrative or exemplary and not restrictive; the invention is not limited to the disclosed embodiments, and in particular not to those embodiments in accordance with the cited 3GPP TSs. Other variations to the disclosed embodiments can be understood and effected by those skilled in the art in practicing the claimed invention, from a study of the drawings, the disclosure, and the appended claims. In the claims, the word "comprising" does not exclude other elements or steps, and the use of indefinite articles "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method of providing an availability of an execution of an Internet Protocol Multimedia Subsystem voice session with a terminal via a packet switched capable radio access network of an Internet Protocol Multimedia Subsystem based communication network, wherein the communication network comprises a packet switched domain associated with the packet switched capable radio access network and comprises a circuit switched domain associated with a circuit switched capable radio access network, wherein the communication network supports an Internet Protocol Multimedia Subsystem voice session via the packet switched capable radio access network, the method being executed by a control node of the packet switched domain, the method comprising:
    determining that the terminal supports an Internet Protocol Multimedia Subsystem voice session via the packet switched capable radio access network and also supports an Internet Protocol Multimedia Subsystem emergency voice session via the packet switched capable radio access network;
    determining whether the circuit switched capable radio access network spatially at least covers the packet switched capable radio access network; and
    sending to the terminal, responsive to said determining that the terminal supports an Internet Protocol Multimedia Subsystem voice session via the packet switched capable radio access network and also supports an Internet Protocol Multimedia Subsystem emergency voice session via the packet switched capable radio access network, and based on the result of said determining whether the circuit switched capable radio access network spatially at least covers the packet switched capable radio access network, instruction information that instructs the terminal that the terminal may execute an Internet Protocol Multimedia Subsystem voice session via the packet switched capable radio access network without regard to whether the communication network has indicated support of an emergency session related data transmission via the packet switched capable radio access network and the packet switched domain, wherein the instruction information further instructs the terminal to exclusively initiate any emergency voice session as a circuit-switched emergency voice session via the circuit switched capable radio access network.

2. The method of claim 1, the method further comprising determining whether the terminal supports communication with the circuit switched domain of the communication network, wherein the sending of the instruction information comprises sending the instruction information based on a result of the determining whether the terminal supports communication with the circuit switched domain of the communication network.

3. The method of claim 1, wherein the communication network is a serving communication network of the terminal distinct of a home communication network of the terminal, the method further comprising:
    determining whether the terminal communicating with the circuit switched domain is in accordance with a roaming agreement between the serving communication network of the terminal and the home communication network of the terminal, wherein the sending of the instruction information comprises sending the instruction information based on a result of the determining whether the terminal communicating with the circuit switched domain is in accordance with a roaming agreement between the serving communication network of the terminal and the home communication network of the terminal.

4. The method of claim 1, the method further comprising:
    receiving, from the terminal, a support indication indicating at least one of the terminal supporting an Internet Protocol Multimedia Subsystem voice session via the packet switched capable radio access network, the terminal supporting an Internet Protocol Multimedia Subsystem emergency voice session via the packet switched capable radio access network, and the terminal supporting communication with the circuit switched domain of the communication network, wherein the sending of the instruction information comprises sending the instruction information based on the received support indication.

5. The method of claim 4, wherein the receiving of the support indication comprises receiving the support indication in an attachment request of the terminal, in a location update request of the terminal or in an Internet Protocol Multimedia Subsystem registration request of the terminal for registering the terminal in an Internet Protocol Multimedia Subsystem domain of the communication network.

6. The method of claim 4, wherein the sending of the instruction information comprises sending the instruction information in response to every reception of the support indication.

7. The method of claim 4, wherein the support indication comprises terminal manufacturing information of the terminal, particularly an International Mobile Equipment Identity of the terminal.

8. A method of providing an availability of an execution of an Internet Protocol Multimedia Subsystem voice session with a terminal via a packet switched capable radio access network of an Internet Protocol Multimedia Subsystem based communication network, wherein the communication network comprises a packet switched domain associated with the packet switched capable radio access network and comprises a circuit switched domain associated with a circuit switched capable radio access network, wherein the communication network supports an Internet Protocol Multimedia Subsystem voice session via the packet switched capable radio access network, wherein the terminal supports an Internet Protocol Multimedia Subsystem voice session via the packet switched capable radio access network and an Internet Protocol Multimedia Subsystem emergency voice session via the packet switched capable radio access network, the method being executed by the terminal, the method comprising:
    receiving instruction information from a control node of the packet switched domain, wherein the instruction information instructs the terminal that the terminal may execute an Internet Protocol Multimedia Subsystem voice session via the packet switched capable radio access network without regard to whether the communication network has indicated support of an emergency session related data transmission via the packet switched capable radio access network and the packet switched domain, wherein the instruction information further instructs the terminal to exclusively initiate any emergency voice session as a circuit-switched emergency voice session via the circuit switched capable radio access network; and
    subsequently initiating an Internet Protocol Multimedia Subsystem voice session via the packet switched capable radio access network, wherein initiating the Internet Protocol Multimedia Subsystem voice session rather than a circuit-switched voice session is based on the received instruction information.

9. The method of claim 8, the method further comprising setting, based on the received instruction information, a terminal parameter of the terminal to indicate the availability of the execution of an Internet Protocol Multimedia Subsystem voice session via the packet switched capable radio access network.

10. The method of claim 9, the method further comprising initiating an Internet Protocol Multimedia Subsystem voice session via the packet switched capable radio access network exclusively if the terminal parameter is set to indicate the availability of an execution of an Internet Protocol Multimedia Subsystem voice session via the packet switched capable radio access network.

11. A control node for providing an availability of an execution of an Internet Protocol Multimedia Subsystem voice session with a terminal via a packet switched capable radio access network of an Internet Protocol Multimedia Subsystem based communication network, wherein the communication network comprises a packet switched domain associated with the packet switched capable radio access network and comprises a circuit switched domain associated with a circuit switched capable radio access network, wherein the communication network supports an Internet Protocol Multimedia Subsystem voice session via the packet switched capable radio access network, the control node being part of the packet switched domain, the control node comprising:
a communication circuit; and
a processing circuit configured to control the communication circuit and to:
determine that the terminal supports an Internet Protocol Multimedia Subsystem voice session via the packet switched capable radio access network and also supports an Internet Protocol Multimedia Subsystem emergency voice session via the packet switched capable radio access network;
determine that the circuit switched capable radio access network spatially at least covers the packet switched capable radio access network; and
control the communication circuit to send instruction information to the terminal, responsive to said determining that the terminal supports an Internet Protocol Multimedia Subsystem voice session via the packet switched capable radio access network and also supports an Internet Protocol Multimedia Subsystem emergency voice session via the packet switched capable radio access network, and based on the result of said determining that the circuit switched capable radio access network spatially at least covers the packet switched capable radio access network, wherein the instruction information instructs the terminal that the terminal may execute an Internet Protocol Multimedia Subsystem voice session via the packet switched capable radio access network without regard to whether the communication network has indicated support of an emergency session related data transmission via the packet switched capable radio access network and the packet switched domain, and wherein the instruction information further instructs the terminal to exclusively initiate any emergency voice session as a circuit-switched emergency voice session via the circuit switched capable radio access network.

12. The control node of claim 11, wherein the control node is configured as a Mobility Management Entity or a Serving General Packet Radio Service Support Node.

13. A terminal for being provided with an availability of an execution of an Internet Protocol Multimedia Subsystem voice session via a packet switched capable radio access network of an Internet Protocol Multimedia Subsystem based communication network, wherein the communication network comprises a packet switched domain associated with the packet switched capable radio access network and comprises a circuit switched domain associated with a circuit switched capable radio access network, wherein the communication network supports an Internet Protocol Multimedia Subsystem voice session via the packet switched capable radio access network, wherein the terminal supports an Internet Protocol Multimedia Subsystem voice session via the packet switched capable radio access network and an Internet Protocol Multimedia Subsystem emergency voice session via the packet switched capable radio access network, the terminal comprising:
a receiver circuit;
a transmitter circuit; and
a processing circuit configured to:
control the receiver circuit to receive instruction information from a control node of the packet switched domain, wherein the instruction information instructs the terminal that the terminal may execute an Internet Protocol Multimedia Subsystem voice session via the packet switched capable radio access network without regard to whether the communication network has indicated support of an emergency session related data transmission via the packet switched capable radio access network and the packet switched domain, wherein the instruction information further instructs the terminal to exclusively initiate any emergency voice session as a circuit-switched emergency voice session via the circuit switched capable radio access network; and
subsequently initiate an Internet Protocol Multimedia Subsystem voice session via the packet switched capable radio access network, wherein the processing circuit is configured to initiate the Internet Protocol Multimedia Subsystem voice session rather than a circuit-switched voice session based on the received instruction information.

* * * * *